United States Patent [19]
Kraus

[11] 3,851,329
[45] Nov. 26, 1974

[54] DIGITAL ANGLE CONVERTER
[75] Inventor: Ronald G. Kraus, Akron, Ohio
[73] Assignee: Kraus Instruments, Inc., Akron, Ohio
[22] Filed: Nov. 3, 1972
[21] Appl. No.: 303,627

[52] U.S. Cl. .................... 340/347 AD, 235/151.11
[51] Int. Cl. ......................................... H03k 13/20
[58] Field of Search ............... 235/151.11; 331/117; 340/347 AD; 318/594

[56] References Cited
UNITED STATES PATENTS

| 3,227,863 | 1/1966 | Winsor | 235/151.11 |
| 3,473,100 | 10/1969 | Anger | 318/18 |
| 3,537,102 | 10/1970 | Baratto | 340/347 |
| 3,569,866 | 3/1971 | Hearn | 331/117 |
| 3,585,630 | 6/1971 | Pomella | 340/347 |
| 3,609,320 | 9/1971 | Tripp | 235/151.11 |

OTHER PUBLICATIONS
Millman & Taub "Pulse, Digital and Switching Waveforms" 1965 McGraw–Hill Ing. Lib. of Cong. No. 64-66293 pp. 390-393

Primary Examiner—Malcolm A. Morrison
Assistant Examiner—Vincent J. Sunderdick
Attorney, Agent, or Firm—Oldham & Oldham

[57] ABSTRACT
A circuit is provided for use with digital height gages or other such digital measuring devices. The circuit provides for the creation of sine and cosine waves which are applied to the slider of an inductosyn scale or other resolver type transducer. A probe is attached to the slider for making contact with the object to be measured. A sine wave signal is taken off of the inductosyn scales, the sine wave having a shifted phase corresponding to the linear position of the slider and probe assembly with relation to the scales. While the slider is being moved and the shifted sine wave created, a decade counter counts at a predetermined rate. The shifted sine wave then inhibits the count at a time dependent upon the degree of shift of the sine wave and correspondingly the amount of movement of the slider and probe assembly. The number contained in the decade counter when it becomes inhibited is then compared with an up-down decade counter which contains a count corresponding to the position of the slider at the end of the previous count cycle. The up-down decade counter then counts in the proper direction until the decade counter and the up-down decade counter contain the same count. A new reading is then taken by the slider and its correspondingly phase shifted sine wave and the cycle begins anew. A counting and display circuit is provided for tallying the total number of counts performed by the up-down decade counter and the direction thereof so as to ascertain the total movement of the slider and probe and the direction thereof for the measurement being performed. Unique circuitry is provided for the creation of the sine and cosine waves applied to the slider and for controlling the interrelationship between the decade counter and the up-down decade counter.

13 Claims, 8 Drawing Figures

DIGITAL ANGLE CONVERTER

BACKGROUND OF THE INVENTION

Heretofore in the field of digital height gages or measuring devices, various approaches have been taken to achieve an accurate digital readout corresponding to the linear position of a probe assembly with respect to some reference. In general, the art teaches the utilization of a probe attached to the slider of an inductosyn scale or other resolver type transducer in such a manner that when the probe is moved along the surface to be measured, signals are produced corresponding to the positional relationship between the transducer and slider. This signal is directly related to the measurement being sought but must be converted into some digital representation so as to be beneficial to the one taking the measurement.

One approach to the utilization of resolver type transducers and digital measuring devices is based upon an amplitude modulation principle. Here, a signal is applied to the slider in such a manner as to cause the output of the transducer to vary in amplitude corresponding to the positional relationship between the slider and the transducer scales. This approach has proved to be unsatisfactory in that complicated circuitry is necessary for both the creation and decoding of the amplitude modulated output signal.

A second approach to the utilization of a resolver type transducer in digital measuring devices has recently become known in the art. This approach teaches that the output pulse width of the signal from the transducer scales varies in accordance with the positional relationship between the slider and the scales. This approach has similarly proved unsatisfactory since intricate circuitry is again necessitated and pulse width measurements of high accuracy have been found difficult to achieve. While this approach might be satisfactory where high accuracy is not necessary, it does not meet the requirements of the modern tooling industry.

Hence, it is the general object of the instant invention to provide a converter which may be utilized in conjunction with digital measurement devices which is not dependent upon an amplitude modulation principle or a pulse width sensing principle. It is based upon a principle which relates phase shift to linear position.

A further object of the instant invention is to provide unique circuitry for the creation of highly accurate and interrelated sine and cosine functions which may interact to create a single sine function, the phase of which is dependent upon the linear position of the slider of a resolver type transducer.

Another object of the invention is to provide a resolver to digital angle converter which utilizes a master oscillator to coordinate the activities of each of the various circuits of the invention, and which further utilizes a novel logic network to properly control the counting necessary to achieve the desired measurement.

Yet another object of the invention is to provide a resolver to digital angle converter which is appropriately able to cooperate with a resolver-type scale and slider arrangement to represent the position of the slider in relation with the scale directly as a digital signal.

And still a further object of the invention is to provide a resolver to digital angle converter which is simplistic in construction, highly reliable, extremely precise, and economical to fabricate.

These and other objects of the invention which will become apparent as the description proceeds are achieved by providing a resolver to digital angle converter, comprising: a resolver type transducer comprising a stationary scales having inductive coils precisely spaced thereon and a slider movably mounted on the scales, the slider being characterized by the presence of inductive coils positioned thereon; a first means connected to the slider for electrically exciting the inductive coils thereof; a second means connected to the scales for sensing the electrical excitation of the coils thereof, the electrical excitation being effectuated by the inductive coupling between the coils of the slider and the coils of the scales and being characteristic of the positional relationship existing between the slider and the scales; and a third means interconnected between the first and second means for determining the positional relationship between the slider and the scales by sensing the phase difference between the electrical excitation of the first means and the resultant electrical excitation of the coils on the scales.

For a better understanding of the apparatus and operation of the instant invention, reference should be made to the accompanying drawings, wherein.

BASIC OPERATION

Figure 1:
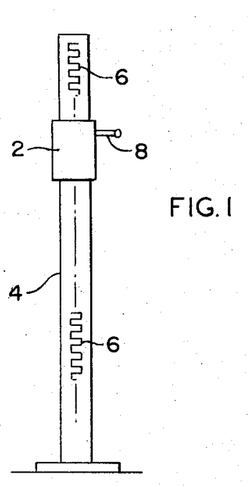
FIG. 1 is a plan view of the mechanical structure of a digital height gage utilizing the teachings of the instant invention.

Referring now to the drawings, and more particularly FIG. 1, a generalized plan view of a resolver type transducer, as it is utilized for a digital measuring device, may be seen. In general, an inductosyn scale 4, characterized by the presence of precisely spaced etched copper coils 6, has attached thereto a movable slider 2 which is characterized by the presence of a probe 8. As will be discussed hereinafter, the slider 2 is characterized by the presence of two sets of etched copper coils which electrically interact with the coils 6 to produce an output signal from the coil 6 which is indicative of the position of the slider 2 on the scales 4. In general operation, the slider 2 would be positioned at an initial point with the probe 8 in contact with one end or point of the object to be measured. The slider 2 is then moved along the scale 4 until the probe 8 comes in contact with a second point on the object. As the slider 2 is so moved, the signals from the coil 6 are analyzed and utilized in making a determination as to the distance between the two points. It is, of course, to be understood that any of numerous probes may be used in such scales, the most commonly known being those which are pressure sensitive and are brought into precise degrees of contact with the object to be measured so as to guarantee exact measurements.

Figure 2:
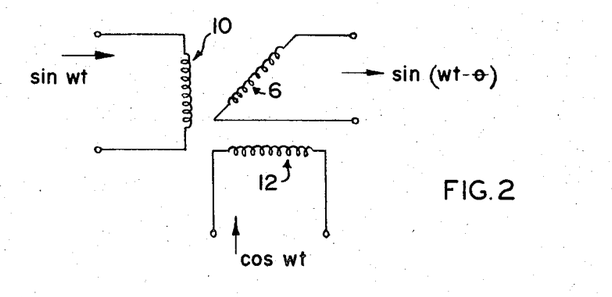
FIG. 2 is a schematic diagram showing the interrelationship between the coils of the slider and the coil of the scales comprising the digital measuring device.

FIG. 2 illustrates the general relationship between the coil 6 on the scale 4 and the coils 10 and 12 which are on the slider 2. This type of coil relationship is well known to those skilled in the art and is similar to that relationship which exists between the slider and inductosyn scales produced by Farrand Controls, Inc., of Valhalla, N.Y. This type of scale and slider arrangement is most desirable for the apparatus of the instant invention in that the coils 10 and 12 contained on the slider 2 do not come in contact with the coil 6 contained on the scales 4. The spaced relationship between these two sets of coils guarantees that there will be no wear therebetween, and that the coils will further be impervious to the effects of normal shop atmosphere which includes oil vapors, water vapors, and dust particles.

The coils 10 and 12 bear a 90° physical relationship with each other on the slider 2 as is illustrated in FIG. 2. The coil 10 will receive the signal sin $\omega t$ on the terminals thereof and the coil 12 will receive the signal cos $\omega t$ across its terminals. Both signals are to be of the same amplitude varying only by the 90° phase shift characteristic between sine and cosine waves. With these signals applied to the coils 10 and 12, a signal will be induced into the coil 6 and evidenced at the output terminals thereof which is equivalent to sin $(\omega t - \theta)$. As is characteristic of the particular transducer used, the angle $(\omega t - \theta)$ is dependent upon the positional relationship between the coils 10 and 12 and the coil 6 and consequently on the position of the slider 2 along the scale 4. Although the exact relationship between these coils may vary depending upon the physical characteristics of the coils, the preferred embodiment of the invention teaches that the angle $(\omega t - \theta)$ will pass through 360° for each 0.10 inch of movement of the slider 2 along the scale 4. As will become apparent hereinafter, this intercoil relationship allows the instant invention to be accurate within 0.0001 inch. It should be generally understood then that the output signal from the coil 6 is dependent upon the position of the slider 2 along the scale 4 and that dependency is evidenced by the phase shift shown by the angle $(\omega t - \theta)$.

Figure 3:
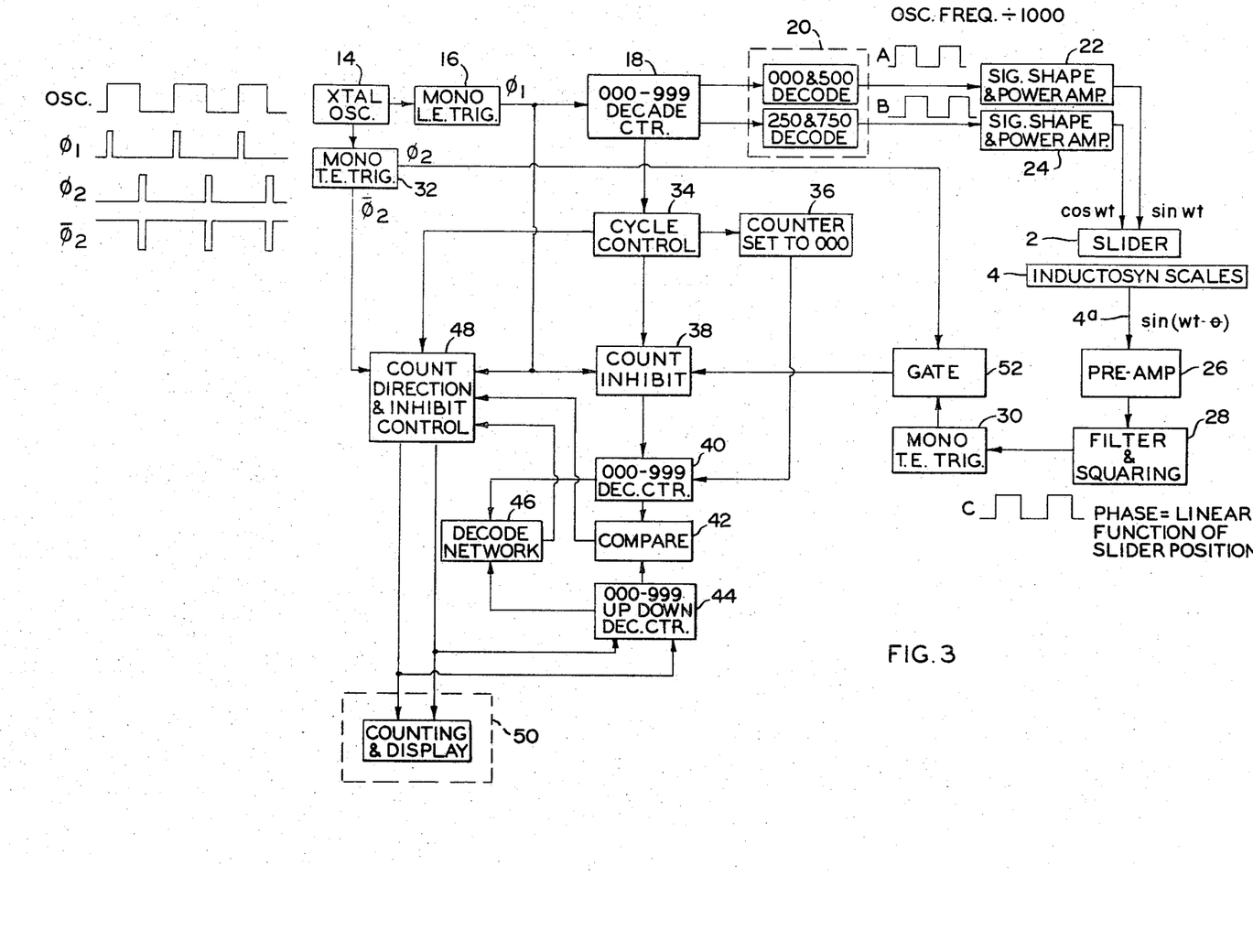
FIG. 3 is a block diagram of the circuitry of the invention.

With the basic understanding of the utilization of a resolver type transducer as a linear sensing means, reference should now be had to FIG. 3 wherein a block diagram of the apparatus of the instant invention is disclosed. Here it can be seen that the basic timing control of the circuitry comprising the invention is achieved by means of the square wave crystal oscillator 14. Although any of numerous oscillators or clocks might be utilized to achieve the purposes of the invention, for purposes of the discussion herein it will be assumed that the crystal oscillator 14 has a characteristic square wave frequency of 2mhz. The oscillator 14 drives the monostable multivibrator 16 which triggers on the leading or rising edge of the square wave produced by the oscillator 14. The output of the multivibrator 16, designated as the signal $\phi 1$, then passes to the decade counter 18 which counts from 000 to 999; one count being experienced on each pulse of the signal $\phi 1$. The output of the decade counter 18 then passes to a decode network 20 wherein the quadrature square waves A and B are created according to a technique which will be discussed hereinafter. It should be noted that the square waves A and B are identical in frequency and amplitude but are 90° out of phase with respect to each other. The signals A and B are then passed to the signal shape and power amplifiers 22 and 24, respectively. It is here that the sine and cosine waves necessary for driving the coils 10 and 12 of the slider 2 are created. Of course, the sine and cosine functions occur because of the 90° phase differential between the signals A and B as will be discussed more fully hereinafter. The sine and cosine functions in the coils 10 and 12 then inductively couple with the coil 6 to produce the phase shifted output on the line 4a of sin $(\omega t - \theta)$.

Due to the fact that the coils 10 and 12 are coupled to the coil 6 through an air medium, the signal sin $(\omega t - \theta)$ is of very small amplitude and is thus carried by a short tightly wound twisted pair 4a to the preamp 26 where the signal is greatly amplified for further use by the system. From the preamp 26, the sine wave signal then passes to a filter and squaring network 28 wherein a square wave C is created fur further use by the system. The square wave C is of course phase shifted with relation to the square waves A and B. The signal C then triggers the monostable multivibrator 30 which produces a signal, the significance of which will become apparent hereinafter.

It should be noted that the frequency of the signals A and B, coming from the decode circuit 20, are characteristically 0.001 times the frequency of the oscillator 14. Consequently, in the specific embodiment of the invention, the sine and cosine waves incident to the slider 2 and the sin $(\omega t - \theta)$ from the output of the scales 4 will have a characteristic frequency of 2khz. This 1000 to 1 relationship in characteristic frequencies is important when considering the inherent accuracy of the instant invention for measurement purposes.

When the decade counter 18 is initialized at 000, the cycle control circuit 34 causes the counter set circuit 36 to set the decade counter 40 to 000. The $\phi 1$ pulses from the monostable multivibrator 16 then pass through the count inhibit circuit 38 to the decade counter 40 and cause that counter to begin to count up toward 999. One count is experienced at each $\phi 1$ pulse.

It should be noted that a second series of pulses, $\phi 2$, are created by the monostable multivibrator 32. These pulses are quite similar to those of $\phi 1$ but are triggered on the trailing or falling edge of the output of the oscillator 14. As should be apparent from the above description, the counting elements of the apparatus of the invention are controlled by the $\phi 1$ pulses. Correspondingly, the logic functions of the instant invention are controlled by the $\phi 2$ pulses. Consequently, counting and logic may be performed during each pulse of the clock produced by the oscillator 14.

At some time after initialization of the circuitry, depending upon the positional relationship between the slider 2 and the scales 4, the signal C will be evidenced at the monostable multivibrator 30. Between the time of initialization and the appearance of the signal C, a particular number of counts have been experienced by the decade counter 40. The output of the multivibrator 30 is gated by the $\phi 2$ pulse into the gate 52 and correspondingly causes the count inhibit circuit 38 to prevent further counting in the decade counter 40. Hence, at the time of arrival of the signal C, a particular number is frozen in the decade counter 40, that number being indicative of the phase shift difference between the pulse C and the pulses A and B and consequently the positional relationship between the slider 2 and the scales 4.

After the count inhibit circuit 38 is activated so as to freeze the count in the decade counter 40, the decade counter 18 continues to count through until again reaching a count of 000. At this time a second signal is passed through the cycle control 34 to the count direction and inhibit control circuit 48. During the next period of time, while the counter 18 is again counting from 000 to 999, comparison and updating techniques are exercised. The up-down decade counter 44 has contained therein a count corresponding to the positional relationship between the slider 2 and the scales 4 during the previous compare cycle. The characteristic of these compare cycles should become apparent directly hereinafter. For purposes of this discussion the up-down decade counter 44 would contain for example the reference number 000 during the first compare cycle. During this compare cycle the compare circuit 42 compares the count in the decade counter 40 with the count in the up-down decade counter 44. Depending upon the relationship therebetween, the compare circuit 42, operating in conjunction with the decode network 46 and the count direction and inhibit control 48 causes the up-down counter 44 to count in the appropriate direction until the count of the up-down decade counter 44 is equivalent to the count of the decade counter 40. The number and direction of counts necessary to achieve this situation is sensed and totalled by the counting and display circuit 50. At the end of this comparison cycle the circuitry waits until the decade counter 18 again reaches a count of 000 at which time the cycle control circuit 34 causes the counter set circuit 36 to set the decade counter 40 to 000 and the cycle begins anew.

It should now be noted, before proceeding with a specific description of the various circuits of the invention, that the invention possesses certain specific characteristics. As mentioned hereinabove, the coils 10 and 12 of the slider 2 and the coil 6 of the scale 4 are, in the preferred embodiment, of such a characteristic that the resultant output sin $(\omega t - \theta)$ will be phase shifted 360° for each 0.10 inch of movement of the slider 2. As has further become evident from the discussion hereinabove, during each cycle of the sin $(\omega t - \theta)$ wave the decade counter 40 may experience a possible 1,000 counts. It should therefore be understood that each count of the decade counter 40 is equivalent to 0.0001 inches. Hence the counting and display circuit 50 will be capable of producing an output accurate to 0.0001 inches. It should further be apparent that a total cycle of sensing the position of the slider 2 with relation to the scales 4 and comparing that position with the previous position requires a total time of one millisecond. The first half millisecond or 1000 counts of the counter 18 is spent in pulsing the decade counter 40 the number of times allowed by the phase shift of the signal C, the second half millisecond or 1000 counts of the counter 18 is utilized in comparing that count with the previous count now contained in the up-down decade counter 44.

It should become apparent that a particular problem might exist if the slider 2 is moved too rapidly along the scales 4. As will be discussed more thoroughly hereinafter, the apparatus of the instant invention has been designed so as to be able to resolve 400 counts per each millisecond cycle time. In other words, the assumption will be made that the slider 2 will not be moved along the scales 4 so rapidly as to go outside the control of the circuitry which is capable of resolving 400 counts per millisecond. Since the circuitry is capable of producing 10,000 counts per inch and is capable of resolving 400 counts per millisecond it should become apparent then that the slider 2 may be moved at the rate of 40 inches per second before going outside the capability of the instant invention. It should be readily recognized that a 40 inch per second limit is quite suitable for use in digital measuring devices and will allow the user to rapidly move the slider 2 along the scales 4 without losing any counts or accuracy in the measurement.

DETAILED DESCRIPTION OF THE CIRCUITRY

SINE AND COSINE WAVE GENERATION

Figure 4:
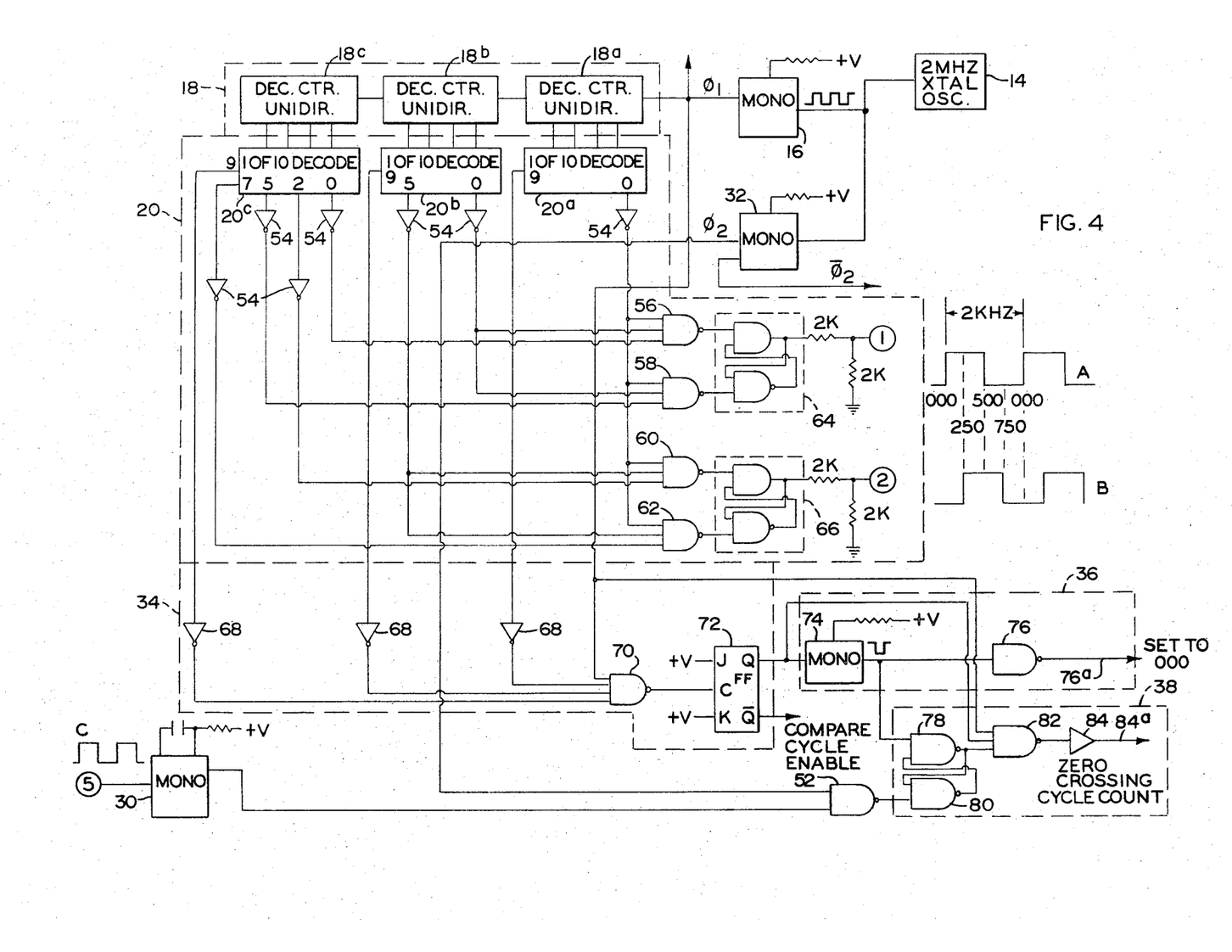
FIG. 4 is a schematic diagram of the sine and cosine wave generating circuits and some related control logic.

Referring now to FIG. 4 it can be seen that the oscillator 14 drives the monostable multivibrators 16 and 32 thus creating the pulses $\phi 1$ and $\phi 2$ as discussed above. The $\phi 1$ pulse, which controls all counting in the system, drives the decade counter 18 which comprises the individual interconnected decade counters 18a, 18b, and 18c. Of course as understood by those skilled in the art the counter 18a controls the units count, 18b controls the tens count, and 18c controls the hundreds count. The output of these counters is in binary coded decimal form which is in turn decoded by means of the decode circuitry 20. This circuitry comprises three decade decoders, 20a, 20b, and 20c one being associated with each of the decade counters 18a, 18b, and 18c. A plurality of inverters 54 are associated with the decoders 20a through 20c to provide the proper logic levels when the outputs of the decoders are at predetermined states. NAND gates 56, 58, 60 and 62 receive the various combinations of the outputs from the inverters 54 so as to cause activation of the latches 64 and 66 when particular counts are present in the decade counters 18. As can be seen, at a count of 000 the output of the NAND gate 56 will go to a high state causing the output of the latch 64 to correspondingly latch at a high state. This output will remain high until a count of 500 is present in the counter 18 at which time the NAND gate 58 will cause the output of the latch 64 to go to its low state at which state it will remain until the count of 000 is again realized. The NAND gates 60 and 62 operate in a similar manner in conjunction with the latch 66 but this latch is caused to be activated when counts of 250 and 750 are present in the counter 18. Thus it can be seen that the quadrature square wave A and B are respectively developed through the decode circuitry 20 are the outputs of the latches 64 and 66.

The quadrature square waves A and B then cause the creation of respective sine and cosine waves by means of the signal shape and power amplifier 22 and 24. Since the circuits 22 and 24 are basically the same in nature, only circuit 24 is shown in detail in FIG. 5. It can be seen that the square wave B is caused to be incident to an input of an operational amplifier A1 through an input resistor R1. The other input of the amplifier A1 is clamped to ground through a terminating resistor R3. A unique feedback tank circuit comprising capacitor C1 and inductor L1 is provided to achieve the sinusoidal characteristic. The inductor L1 is variable in nature and is utilized for the purposes of adjusting the phase shift and amplitude of the sine or cosine wave being generated. It should be understood that both circuits 22 and 24 have such variable inductors so that the sine and cosine waves created thereby may be tuned to be in exactly the proper phase relationship. It has been found that the use of such an amplifier and tank circuit arrangement results in a pure sine or cosine function which is highly accurate and stable in nature. Although any of numerous elements may be utilized to achieve the purposes of this circuit, it has been found that the best combination is achieved when the operational amplifier A1 is similar in nature to the national semiconductor amplifier 747 and the various passive elements of the circuit have the values illustrated in the drawing. These values result in the proper gain for the amplifier A1 and guarantee a high Q for the tank circuit. It should be understood then that the output of the amplifier A1 is a perfect sinusoidal wave swinging about a zero or ground reference. However, as is understood by those skilled in the art, such signals are susceptible to what is known as zero crossover distortion. Consequently, it is contemplated that this signal be shifted by means of the amplifier A2 so as to operate totally above the zero reference level. In other words, the output signal from the amplifier A2, as is shown in the drawings, will maintain the sinusoidal characteristics but will fluctuate above the ground level.

Figure 5:
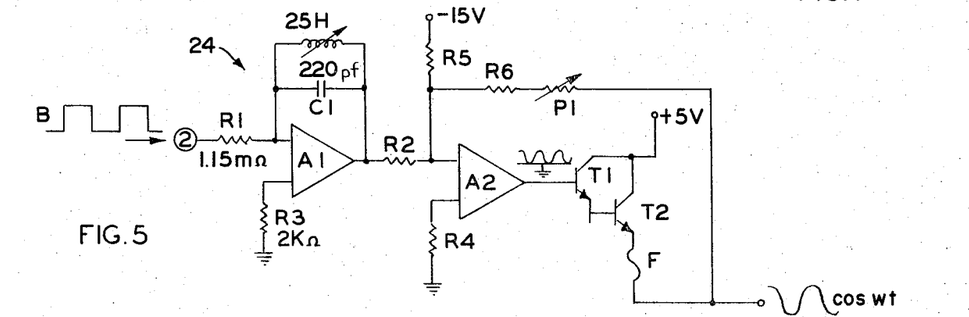
FIG. 5 is a schematic diagram of the sinusoidal wave shaping and power amplifying circuit.

The feedback network comprising resistors R5, R6 and potentiometer P1 is utilized to achieve the appropriate gain from the amplifier A2. It is important to the operation of the invention that the sine and cosine functions be of the same amplitude; this amplitude being controlled by means of the potentiometer P1. It should be understood that only one of the circuits 22 or 24 need have the potentiometer P1 for adjustment purposes to guarantee that the signals of each are of the same amplitude. This is the only difference between these two circuits and of course it is to be understood that both circuits could indeed contain the potentiometer P1.

The Darlington circuit comprising transistors T1 and T2 controls the power or current drive to be available to the coils or the slider 2. The amplifier A2 operating in conjunction with the Darlington circuit produces a sinusoidal output having a 0.6 volt peak to peak swing and sufficient current drive to affect the coils of the slider 2. The fuse F is provided to insure that no damage will result to the coils of the slider 2 in case of a malfunction of the circuitry 22 or 24.

It can be seen then that the sin $\omega t$ and cos $\omega t$ signals are created by and phase related to the main clock oscillator 14 which controls the timing and interrelationships of the pulses affecting the circuitry of the instant invention. It should be particularly noted that it has been found that the utilization of the unique circuitry shown in FIG. 5 results in a pure sine or cosine function, the accuracy of which allows the instant invention to be accurate within 0.0001 inches.

CREATION OF THE PULSE C

Figure 6:
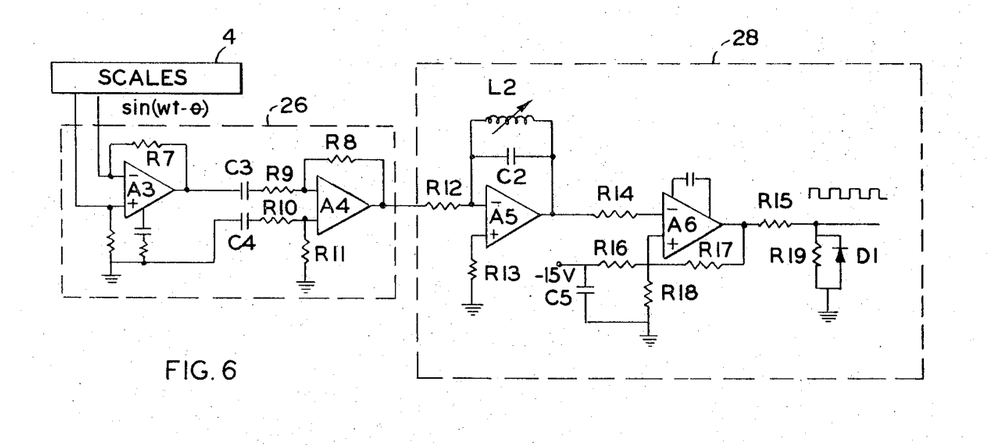
FIG. 6 is a schematic diagram of the output amplifying, filtering, and squaring circuitry associated with the measuring scales of the invention.

It should be understood now that with the sine and cosine waves created hereinabove applied to the coils 10 and 12 of the slider 2 a phase shifted sine wave will be created in the coil 6 of the scales 4. This signal, sin $(\omega t - \theta)$, is of extremely low amplitude due to the small currents and loose coupling of the various coils. Consequently, the signals from the scales 4 must be amplified so as to guarantee that they will be of suitable amplitude for use by the remainder of the circuitry. As can be seen in FIG. 6, the output of the scales 4 is passed to a preamp 26 which comprises two separate amplifying stages. Since the output of the scales 4 is of extremely small amplitude it is contemplated that the first amplifying stage be placed in close proximity with the scales 4. The output wave sin $(\omega t - \theta)$ is applied differentially by means of closely wound twisted pair to the inputs of the amplifier A3 having an appropriate feedback through resistor R7 to achieve a gain which is contemplated to be 1,000:1. The output of this amplifying stage is then capacitively coupled to the input of a second amplifying stage comprising amplifier A4 and feedback resistor R8 to achieve a second degree of amplification which is contemplated to be 5:1. Of course, the coupling capacitors C3 and C4 and the input resistors R9, R10, and R11 should be appropriately selected to achieve the proper input relationships.

Due to the loose coupling between the coils of the slider 2 and the coil of the scale 4, it has been found that the output signal thereof and consequently the output signal of the amplifier A4 may possibly have a jittering nature. Consequently, the output of the amplifier A4 is fed to a filter and squaring network 28 where the jitter is stabilized and the sin $(\omega t - \theta)$ signal is transformed into a square wave for further utilization by the circuitry. The filtering circuit comprises an input resistor R12 connected to an operational amplifier A5 having a feedback tank circuit comprising capacitor C2 and inductor L2. It should be readily apparent that this filtering circuit is quite similar in nature to the sine function generating circuit illustrated in detail in FIG. 5. It has been found that by proper adjustment of the variable inductor L2 the jittering of the sine wave from the amplifier A4 may be eliminated and the sin $(\omega t - \theta)$ signal purified.

Figure 7:
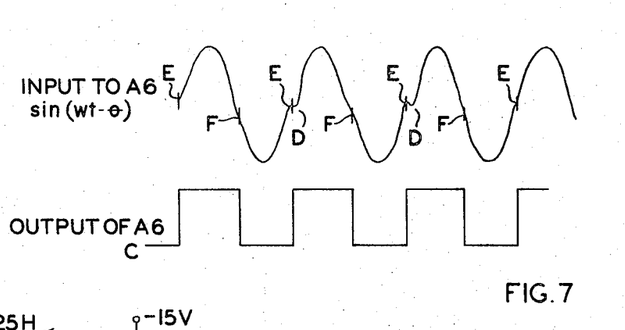
FIG. 7 illustrates the wave form relationships associated with the filtering and squaring circuitry.

The output of the amplifier A5 is then passed to the squaring circuitry comprising the operational amplifier A6 and the hysteresis network of R16, R17, R18, and C5. The utilization of an amplifier for purposes of squaring a sine wave is well know to those skilled in the art. The instant invention however utilizes the unique hysteresis network to guarantee that there will be no false triggering of the amplifier A6 due to any noise or jitter which might be introduced into the system. As can be seen in FIG. 7, the input to the amplifier A6 would generally constitute a perfect sine or cosine wave. However, it is possible that reflections or noise coupling in the circuitry might cause dips D in this signal. If the dips D in the signal fall below the triggering level of the amplifier A6 then it is conceivable that the amplifier might falsely trigger and produce an output not corresponding to the ideal input signal. For this reason the circuitry has been designed with a hysteresis network as mentioned above such that the triggering level of the amplifier for the rising edge of the output pulse will be higher than the trigger level for the falling edge of the output pulse. These rising edge and falling edge triggering levels are indicated respectively by the letters E and F. It can be seen then that even if a dip D does occur in the sinusoidal wave it is unlikely that such a dip will be of sufficient magnitude to fall below the F level and thus cause a triggering of the falling edge. Hence it can be seen that the provision of this hysteresis network guarantees an accurate output pulse not effected by noise or jitter which might be incident to the circuit. It will be noted of course that the output of the amplifier A6 will not be a symmetrical square wave but will have up levels of a longer duration than the down levels. This however does not present a problem since the levels utilized in the system are the transitional periods of the output pulse occuring on the rising edge thereof. Consequently, it can be seen that this rising edge always occurs at the zero crossover point of the sinusoidal wave and will consequently be consistently accurate.

The squaring circuitry is further provided with a voltage divider comprising resistors R15 and R19 to make the output pulse of the amplifier A6 of a suitable amplitude. There is further provided a diode D1 to clamp the output signal so as to prevent its falling below the ground level. Hence it can be seen that the output pulse will be an unsymmetrical square wave operating above ground and thus suitable for application to the monostable multivibrator 30.

DETAILED DESCRIPTION OF CYCLE CONTROL 34, COUNTER SET 36, AND COUNT INHIBIT 38

Referring again to FIG. 4 a thorough understanding of the operation of the control logic blocks of the apparatus of the invention may be had. It should be noted that the cycle control circuit 34 comprises a decode circuit comprising inverters 68 and NAND gate 70 and a flip flop 72. It should be apparent that the decode circuitry is such that when the counter 18 contains 999 the flip flop 72 will be caused to toggle at the next $\phi 1$ pulse which also causes the counter 18 to go to a count of 000. Upon initialization of the circuitry the counter 18 contains a count of 000 and the flip flop 72 has a Q output in the high state. After the counter 18 counts to a count of 999 the flip flop 72 will toggle such that the Q output is at the low state on the next $\phi 1$ pulse. Thus it can be seen that the flip flop 72 serves the purpose of dividing the operational time of the invention into two segments, the count segment and the update segment. With the Q output high the circuitry is in the count mode in which the counter 40 counts to a number indicative of the phase shift of the pulse C. With the Q output high the counter 40 is inhibited from counting and the system goes into its compare and update cycle where the up-down decade counter 44 achieves the count of the decade counter 40.

The counter set circuit 36 operates under the control of the cycle control circuit 34. As can be seen from FIG. 4, when the Q output of the flip flop 72 goes to its high state during the count cycle the monostable multivibrator 74 is triggered to produce a negative going one shot output pulse which is inverted by the NAND gate 76 and passes to the decade counter 40 to set that counter to 000. At the same time the output of the multivibrator 74 sets the latch comprising NAND gates 78, 80 so as to enable the gate 82 to pass the $\phi 1$ pulses to the decade counter 40 through the inverter 84. The $\phi 1$ pulses will continue to pass through the NAND gate 82 and the inverter 84 until the latch comprising gates 78 and 80 is reset by means of the combination of the $\phi 2$ pulse and the one shot pulse from the multivibrator 30 which indicates the presence of the phase shifted square wave C. The output of the multivibrator 30 is a single shot pulse contemplated to be of one microsecond duration so as to guarantee its coincidence with the $\phi 2$ logic pulse.

With the latch comprising gates 78 and 80 reset the gate 82 is inhibited from passing the $\phi 1$ pulses to the counter 40 and hence a count is frozen therein. When the decade counter 18 again reaches a count of 000 the flip flop 72 resets such that the Q output is low, further inhibiting the gate 82, and the $\bar{Q}$ output is high. It is to be particularly understood, as mentioned hereinabove, that the outputs of the flip flop 72, which directly control the counting and update cycles of the circuitry, are square waves of one millisecond duration; Q and $\bar{Q}$ being high and low during opposite one half millisecond periods.

DETAILED DESCRIPTION OF DECADE COUNTER 40, COMPARE CIRCUIT 42, UP-DOWN COUNTER 44, DECODE NETWORK 46, AND COUNT DIRECTION AND INHIBIT CONTROL CIRCUIT 48.

Figure 8:
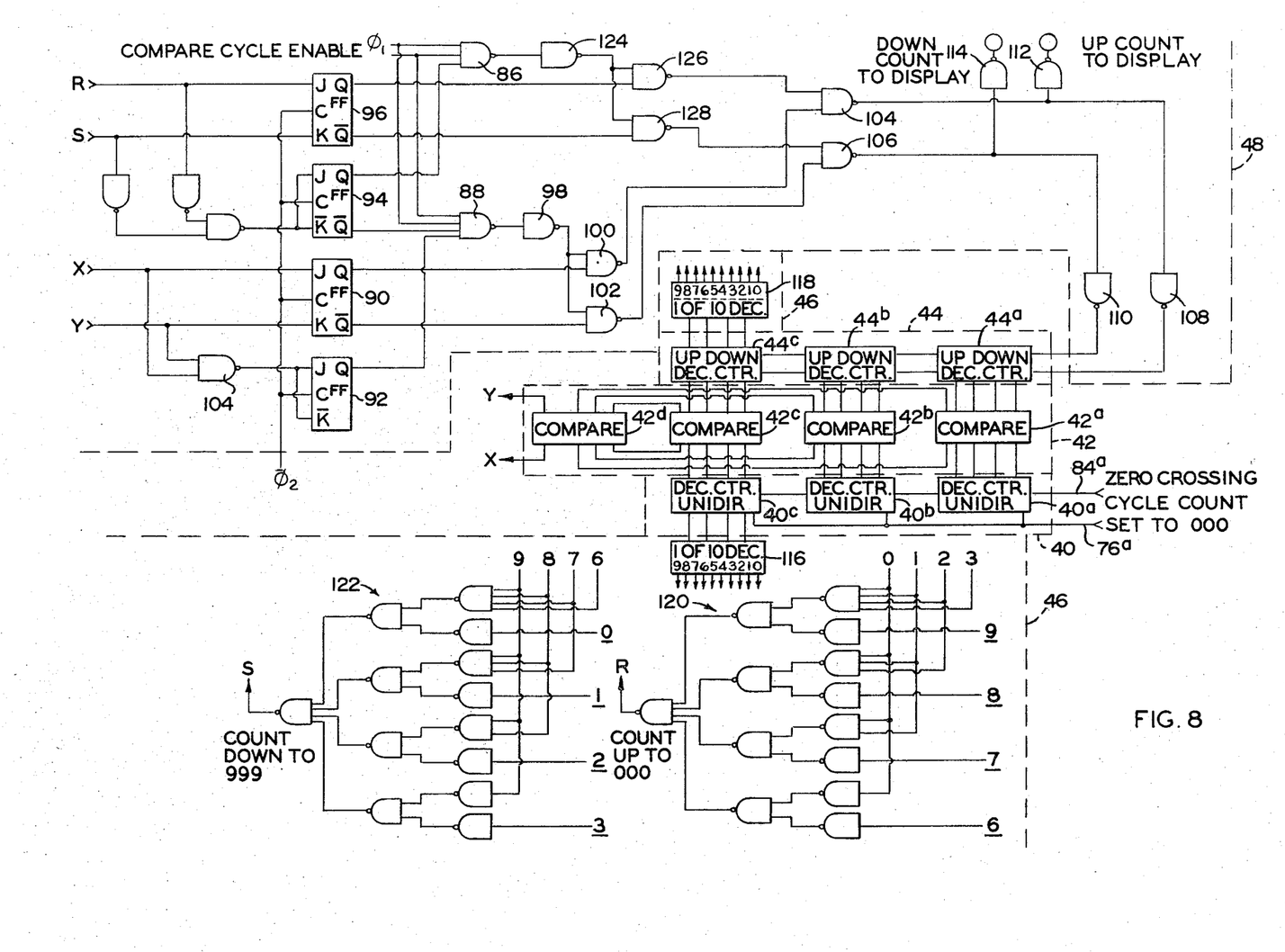
FIG. 8 is a schematic showing of the counting and decoding networks of the invention.

It should now be understood that the instant invention operates in one millisecond cycles, the first half millisecond being a counting cycle wherein a count indicative of the position of the slider 2 with respect to the scales 4 is entered into a counter 40 and a second half millisecond during which the count contained in the counter 40 is compared with the up-down counter 44 and proper updating procedure is exercised. The decade counter 40 comprises a plurality of unidirectional decade counters 40a, 40b, and 40c. These counters respectively control the units, tens, and hundreds digits of a 3 digit decade count. A set pulse is received by the counters through the line 76a from the NAND gate 76 at the start of each count cycle. The actual counting is achieved by the $\phi 1$ pulses passing through the line 84a from the inverter 84. When the sine wave sin $(\omega t - \theta)$ crosses zero on its rising edge the square wave C experiences a positive going transition causing the latch comprising gates 78 and 80 to reset and thus freezing the count in the counter 40 at what is known as the zero crossing. It is of course to be understood that any of numerous unidirectional decade counters might be utilized for the purposes of the decade counter 40.

With a number so frozen in the counter 40, the compare cycle enable pulse incident to the gates 86 and 88 enables the count direction and inhibit control circuit 48 so as to efftuate the comparison and update between the counter 40 and the up-down counter 44. This comparison is achieved by the compare circuit 42 which comprises individual comparators 42a through 42d. These comparators are contemplated to be similar in nature to the National Semiconductor comparator 8200. Each such comparator has two outputs the states of which are dependent upon the comparison between the two inputs. There is one comparator associated with and performing the comparison between each decade counter 40a through 40c and each up-down counter 44a through 44c. The outputs of each of these comparators 42a and 42c is fed to the comparator 42d wherein the final comparison is achieved. In general, if the count at the counter 40 is higher than the count in the counter 44 then the X output of the compare circuit 42 will be at a high state and the Y output at a low state. If the up-down counter 44 contains a higher count than the counter 40 then the Y output of the compare circuit 42 will be at a high state and the X output at a low state. If both counters 40 and 44 contain the same count then the X and Y outputs will both be at a high state. This comparison relationship is well known and understood by those skilled in the art and is characteristic of the above-mentioned National Semiconductor comparator.

The X and Y outputs of the compare circuit 42 feed the X and Y inputs of the count direction and inhibit control circuit 48. If the X input is high and the Y low, signifying that the count in the counter 40 is greater than that in the counter 44, then the Q output of flip flop 90 will be at a high state and the Q output at a low state. Consequently, the NAND gate 100 will be enabled and the gate 102 inhibited. With either the X or Y line in a low state the output of the NAND gate 104 will be at a high state and consequently the Q output of the D-type flip flop 92 will be at a corresponding high state thus enabling the NAND gate 88. Assuming that the Q output of the flip flop 94 is at a high state it can be seen that the NAND gate 88 will, during the compare cycle enable pulse, pass $\phi 1$ pulses through the NAND gates 98 and 100. With the NAND gate 104 enabled these $\phi 1$ pulses will affect the NAND gates 112 and 108. The output of the NAND gate 108 feeds the up-down counter 44 at the up count input causing that counter to count up from its present position; one count being realized on each $\phi 1$ pulse. This cycle would continue until the up-down counter 44 contains the same count as the counter 40. When this equality exists then the X and Y outputs of the compare circuit 42 will both be high thus causing the Q output of the D-type flip flop 92 to go to a low state thus inhibiting the NAND gate 88 and thus preventing any further count of the up-down counter 44. It should of course be understood that if during the compare cycle the Y output were high and the X output low thus signifying that the count of the counter 44 was greater than the counter 40 then the $\phi 1$ pulses would have travelled through the NAND gates 88, 98, 102, 106 and 110 to effect a count down of the up-down counter 44. In either case when both the X and Y outputs are at a high state then further counting is inhibited by means of the low output of the D-type flip flop 92. It should further be noted that the activation of the flip flops is achieved by the $\phi 2$ pulses taken from the monostable multivibrator 40. As will be recalled, all logic operations are performed at $\phi 2$ time.

It should now be recalled that the phase shift of the signal $\sin(\omega t - \theta)$ will vary through 360° for each 0.10 inch movement of the slider 2 along the scales 4. It should be understood that a problem may arise when the slider 2 makes a transition from one 0.10 inch segment of the scales 4 to an adjacent 0.10 inch segment. If the up-down counter 44 contained a count of 900, indicating that at the end of the last millisecond measuring cycle the slider 2 was positioned 90 percent of the way through a particular 0.10 inch segment of the scales 4 and if during the next compare cycle it is seen that the counter 40 contains a count of 200 it becomes questionable whether the slider has moved up 300 counts into the next 0.10 inch segment of the scales 4 or has stayed within the same 0.10 inch segment of the scales 4 but dropped down 700 counts or 70 percent of that segment. As was mentioned hereinbefore, provisions have been made whereby this problem may be readily resolved provided that the slider 2 never be moved more rapidly than the extremely fast rate of 40 inches per second. These provisions have been made by means of the decode network 46 which comprises two one of ten decoders 116 and 118 and two identical networks of NAND gates 120 and 122. It should be noted that the outputs of the decoders 116 and 118 are complimentary; that is, a low state indicates the presence of that numeral and a high state indicates the absence thereof. It should further be noted that the decoder 116 decodes the most significant digit from the counter 40 and the outputs thereof are indicated by the numerals 0 through 9, and the decoder 118 decodes the output of the most significant digit of the counter 44 and its outputs are designated by the numerals 0 through 9.

With this understanding reference should be had to the NAND gate network 120 the inputs of which are the outputs 0 through 3 of the one of ten decoder 116 and the outputs 6 through 9 of the one of ten decoder 118. Correspondingly, the inputs to the NAND gate network 122 are the outputs 6 through 9 of the one of ten decoder 116 and 0 through 3 of the one of ten decoder 118. Bearing in mind that the logic level outputs of the decoders 116 and 118 are complimentary, negative logic, it can be seen that the output R will be high when the most significant digit of the count in the counter 40 minus the most significant digit of the count in the counter 44 is equal to or greater than 6. This situation, when R is high, indicates that the slider 2 has moved up into a new 0.10 inch segment on the scale 4. Similarly, the output S of the network 122 will be high when the most significant digits of the count in the counter 40 minus the most significant digit in the count of the counter 44 is greater than or equal to 6. This situation, when S is high, indicates that the slider 2 has moved down into the next lower 0.10 inch segment of the scales 4. Hence it should be seen that the networks 120 and 122 may sence and create an output in correspondence with any change of position of the slider 2 with respect to the scales 4 equivalent to 400 counts during any millisecond cycle time when the slider 2 has passed from one 0.10 inch segment to another 0.10 inch segment of the scales 4. It is for this reason that the limitation has been made on the movement of the slider 2 at a rate not to exceed 40 inches per second.

If outputs are evidenced at R or S indicating that a transition has been made into a different 0.10 inch segment of the scales 4 then special circuitry must be activated to bring the count of the up-down counter 44 into a region wherein the circuitry described hereinabove may take over the updating of the counter 44 so as to properly achieve the correct count. For example, if the counter 44 contained a count of 900 and the counter 40 a count of 100 then it must be assured that the up-down counter 44 will count up 200 to the next 0.10 inch segment rather than count down 800 within the same 0.10 inch segment since the limitation on the rate of movement of the slider 2 indicates that a transition into the next higher 0.10 inch segment has occurred. To achieve this the outputs of the networks 120 and 122 are applied to the inputs of the flip flop 96 and the D-type flip flop 94 as illustrated. It can be seen that if the output R of the network 120 is high then the Q output of the flip flop 96 will be high and the Q output low thus enabling the NAND gate 126 and inhibiting the gate 128. Correspondingly, the output of the flip flop 94 will be high enabling the gate 86. The Q output of the D-type flip flop 94 will be at a low state inhibiting the gate 88 and thus dissabling the effects of the X, Y outputs from the comparator circuit 42 upon the flip flops 90 and 92. It can be seen then that the φ1 pulses will pass through the NAND gates 96, 124, 126, 104, and 108 thus causing the counter 44 to count up. When the counter 44 has counted up to a count of 000 then the output R of the network 120 will go to a low state causing the D-type flip flop 94 to inhibit the gate 86 and enable the gate 88 such that the flip flops 90 and 92 activate so as to enable the continuation of the count as discussed hereinabove. A correspondingly similar operation would have been performed if the output S of the network 122 had been high. In this case the counter 44 would have been caused to count down through the gates 86, 124, 128, 106, and 110 to a count of 999 at which time the flip flops 90 and 92 would have resumed the count down to completion.

It should be particularly noted that each count, whether controlled by the flip flops 94 and 96 or the flip flops 90 and 92, is picked off and transmitted through the gates 114 or 112 to the counting and display circuit 50 which totals the number of up and down counts experienced during each millisecond cycle of the entire measurement and, at the end of the measurement, presents this grand count as a visibly recognizable digital output by means of an arrangement of up-down counters, decoder circuitry, and nixi tubes. It is contemplated of course that the counting and display circuit 50 will have associated therewith a sign indicator which will indicate whether the total movement of the slider 2 has been in a positive or negative direction and will further have associated therewith a preset switch so as to select any position of the slider 2 along the scales 4 as a reference position. Since such counters and display networks are commonly known to those skilled in the art and readily available for public use the counting and display circuit 50 has not been presented or described in detail.

Thus it can be seen that the objects of the invention have been met by the circuitry described and illustrated hereinabove. While in accordance with the Patent Statutes only the best known and preferred embodiment of the invention has been presented and described in detail, it is to be understood that the invention is not to be limited thereto or thereby. For the ascertainment of the true scope of the invention reference should therefore be had to the appended claims.

What is claimed is:

1. A resolver to digital angle converter, comprising:

a resolver type transducer comprising a stationary scales having inductive coils precisely spaced thereon and a slider moveably mounted on the scales, the slider being characterized by the presence of inductive coils positioned thereon;
   a first means connected to the slider for electrically exciting the coils thereof with sine and cosine waves of fixed amplitude and frequency;
   a second means connected to the scales for sensing the sinusoidal signal induced therein by the inductive coupling between the coils of the slider and the coils of the scales, the sinusoidal signal having a phase shift with respect to the sine and cosine waves a degree characteristic of the positional relationship existing between the slider and the scales, the second means including a squaring amplifier circuit and a hysterisis feedback network for transforming the sinusoidal signal into an unsymmetrical square wave; and
   a third means interconnected between the first and second means for determining the positional relationship between the slider and the scales by sensing said phase shift, the third means being responsive to voltage level transitions of the unsymmetrical square wave.

2. The resolver to digital angle converter as recited in claim 1 wherein the stationary scales have a single set of inductive coils and the slider has two sets of inductive coils.

3. The resolver to digital angle converter as recited in claim 2 wherein the first means comprises sine wave and cosine wave generating circuits so connected to the coils of the slider that one coil thereof receives a sine wave and the other a cosine wave, the coils of the scales thereby inductively receiving a sinusoidal signal having a phase shift with respect to the sine and cosine waves indicative of the positional relationship between the scales and the slider.

4. The resolver to digital angle converter as recited in claim 3 wherein the sine and cosine wave generating circuits comprises the first operational amplifier having a feed back tank circuit comprising a capacitor of fixed value in shunt with an inductor.

5. The resolver to digital angle converter as recited in claim 3 wherein the second means comprises:
   a high gain amplifier connected to and receiving the sinusoidal signal from the coils of the scales;
   a filtering circuit connected to the high gain amplifier to stabilize and purify the output therefrom; and
   a squaring amplifier circuit connected to the filtering circuit and transforming the sinusoidal output thereform into a square wave.

6. The resolver to digital angle converter as recited in claim 1 wherein the first means comprises sine wave and cosine wave generating circuits so connected to the coils of the slider that one coil thereof receives a sine wave and the other a cosine wave.

7. The resolver to digital angle converter as recited in claim 6 wherein the second means comprises:
   a high gain amplifier connected to and receiving the sinusoidal signal from the coils of the scales; and
   a filtering circuit connected to the high gain amplifier to stabilize and purify the output therefrom.

8. The resolver to digital angle converter as recited in claim 6 wherein each of the sine and cosine wave generating circuits comprise a first operational amplifier having a feed back tank circuit including a capacitor of fixed value to shunt with an inductor.

9. The resolver to digital angle converter as receited in claim 8 wherein the sine and cosine wave generating circuits further include a second operational amplifier connected to the first operational amplifier and having a feed back path of such nature as to cause the output of the second operational amplifier to have pure sinusoidal characteristics with a level shift causing the output to fluctuate above a ground reference so as to eliminate crossover distortion.

10. A resolver to digital angle converter, comprising:

a resolver type transducer comprising a stationary scales having inductive coils precisely spaced thereon and a slider moveably mounted on the scales, the slider being characterized by the presence of inductive coils positioned thereon;

a first means connected to the slider for electrically exciting the inductive coils thereof with sine and cosine waves;

a second means connected to the scales for sensing the electrical excitation of the coils thereof, the electrical excitation being affectuated by the inductive coupling between the coil of the slider and the coils of the scales and being characteristic of the positional relationship existing between the slider and the scales;

a first counter circuit connected to the first means and controlling the generation of the sine and cosine waves;

a second counter circuit connected to and under the control of the first counte circuit, the second counter circuit counting at a predetermined rate and achieving a count indicative of the linear movement of the slider with respect to the scales during a predetermined time interval;

an up-down counter containing the count of the second counter circuit at the end of an immediately preceding predetermined time interval;

a compare circuit interconnecting the second counter circuit and the up-down counter, the output of the compare circuit being indicative of the comparative relationship between the counts of the second counter and the up-down counter; and a control circuit interconnected between the up-down counter and the compare circuit causing the up-down counter to achieve the count of the second counter circuit.

11. The resolver to digital angle converter as recited in claim 10 which further includes a decode network interconnected between the second counter circuit, the up-down counter, and the control circuit which causes the control circuit to cause the up-down counter to count in the appropriate direction when the difference between the counts in the second counter circuit and the up-down counter is above a particular value.

12. The resolver to digital angle converter as recited in claim 10 which further includes a counting and display circuit interconnected between the control circuit and the up-down counter so as to sense, total, and display the number of counts necessary and the direction thereof to cause the up-down counter to achieve the count of the second counter circuit, the counting and display circuit keeping a grand total of all such counts during a plurality of predetermined time intervals.

13. A method for determining the positional relationships between a stationary scale having inductive coils precisely spaced thereon and a slider having inductive coils spaced thereon, the slider being movably positioned upon the scale, comprising the steps of:

a. electrically exciting the coils of the slider with a combination of sine and cosine waves;

b. sensing the electrical signal induced in the coils of the stationary scale as a result of the electrical excitation of the coils of the slider;

c. counting, by means of a first counter, at a uniform rate from a time coincident with the excitation of the slider coils;

d. ceasing the counting of the first counter at a time dependent upon phase shift of the induced electrical signal with respect to the sine and cosine waves;

e. comparing the count of the first counter with the count of a second counter, the count of the second counter being indicative of the positional relationship between the slider and the scales at the beginning of the excitation of the slider coils;

f. updating the count of the second counter to be equivalent with the count of the first counter so as to allow the second counter to serve as a reference for a next subsequent excitation of the slider coils; and g. sensing, totalling, and displaying the degree of updating required for each excitation of the slider coils, the cumulative updating so required being indicative of the positional relationship between the slider and the scale during the period of such excitations.

* * * * *